United States Patent
Maeda et al.

(10) Patent No.: US 9,011,256 B2
(45) Date of Patent: Apr. 21, 2015

(54) DAMPER DEVICE

(75) Inventors: Koji Maeda, Anjo (JP); Kazuyoshi Ito, Tsushima (JP); Takashi Hori, Anjo (JP); Akihiro Nagae, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 13/996,837

(22) PCT Filed: Mar. 30, 2012

(86) PCT No.: PCT/JP2012/058671
§ 371 (c)(1),
(2), (4) Date: Jun. 21, 2013

(87) PCT Pub. No.: WO2012/133816
PCT Pub. Date: Oct. 4, 2012

(65) Prior Publication Data
US 2013/0288808 A1    Oct. 31, 2013

(30) Foreign Application Priority Data

Mar. 30, 2011    (JP) ................................. 2011-076142

(51) Int. Cl.
*F16F 15/121*    (2006.01)
*F16H 45/02*    (2006.01)

(52) U.S. Cl.
CPC .............. *F16F 15/121* (2013.01); *F16H 45/02* (2013.01); *F16H 2045/0205* (2013.01); *F16H 2045/0221* (2013.01); *F16H 2045/0294* (2013.01)

(58) Field of Classification Search
CPC .............. F16F 15/1217; F16F 15/1238; F16F 15/12366

USPC .................... 464/68.7, 68.8, 64.1, 66.1, 68.1; 192/213, 213.1, 213.2

See application file for complete search history.

(56) References Cited

U.S. PATENT DOCUMENTS

| | | | |
|---|---|---|---|
| 5,401,213 A | * | 3/1995 | Muchmore et al. |
| 6,244,401 B1 | | 6/2001 | Maienschein et al. |

(Continued)

FOREIGN PATENT DOCUMENTS

| | | |
|---|---|---|
| JP | A-2002-310262 | 10/2002 |
| JP | A-2006-70982 | 3/2006 |
| JP | A-2009-41737 | 2/2009 |

(Continued)

OTHER PUBLICATIONS

International Search Report issued in International Patent Application No. PCT/JP2012/058671 mailed Jun. 26, 2012.

*Primary Examiner* — Gregory Binda
(74) *Attorney, Agent, or Firm* — Oliff PLC

(57) ABSTRACT

A damper device configured with an input element, an intermediate element to which power is transferred from the input element through a first elastic body, and an output element to which power is transferred from the intermediate element through a second elastic body. One of the output element and the intermediate element has a protruding portion projecting in an axial direction. The other one of the output element and the intermediate element has a cutout portion corresponding to the protruding portion. The protruding portion has a restricting portion that is engaged with the cutout portion in a rotation direction so as to restrict rotation of the intermediate element relative to the output element, and a support portion that is engaged with the cutout portion so that the intermediate element is supported by the output element in a radial direction.

14 Claims, 7 Drawing Sheets

(56) References Cited

U.S. PATENT DOCUMENTS 6,695,110 B2 * 2/2004 Maienschein et al. . 192/213.1 X
2011/0011691 A1 1/2011 Tomiyama

FOREIGN PATENT DOCUMENTS

JP  A-2009-250288  10/2009
JP  A-2012-36994  2/2012

* cited by examiner

DAMPER DEVICE

INCORPORATION BY REFERENCE

The disclosure of Japanese Patent Application No. 2011-076142 filed on Mar. 30, 2011 including the specification, drawings and abstract is incorporated herein by reference in its entirety.

BACKGROUND OF THE INVENTION

The present invention relates to a damper device that includes an input element, an intermediate element to which power is transferred from the input element through a first elastic body, and an output element to which power is transferred from the intermediate element through a second elastic body.

DESCRIPTION OF THE RELATED ART

Conventionally, there is known a damper device as this type of damper device which includes a plurality of outer coil spring sets, a plurality of inner coil spring sets, an intermediate member that supports the outer coil spring sets and the inner coil spring sets so that the outer coil spring sets and the inner coil spring sets are able to be deformed elastically in a rotation direction so as to operate in series, and an output plate (for example, see Japanese Patent Application Publication No. 2009-250288 (JP 2009-250288 A)). A position of the intermediate member of the damper device is determined radially by a cylindrical portion that is formed in the output plate. Further, the intermediate member has a first support plate and a second support plate that are connected to each other, and first protruding portions formed in the second support plate and second protruding portions formed in the output plate abut on each other in the rotation direction, which restricts relative rotation of the intermediate member and the output plate.

SUMMARY OF THE INVENTION

In the aforementioned conventional damper device, the cylindrical portion is formed in the output plate in order to support (align) the intermediate member in the radial direction, and the first protruding portions are formed in the second support plate and the second protruding portions are formed in the output plate in order to restrict relative rotation of the intermediate member and the output plate. Therefore, in the aforementioned conventional damper device, working man-hours are increased in manufacturing the damper device, and it is required to ensure working accuracy for each of the cylindrical portion and the first and second protruding portions, and thus a cost increase is unavoidable.

Thus, a main object of the present invention is that, in a damper device including an input element, an intermediate element to which power is transferred from the input element through a first elastic body, and an output element to which power is transferred from the intermediate element through a second elastic body, the intermediate element is able to be aligned easily and accurately, and rotation of the intermediate element relative to the output element is able to be restricted, while a cost increase is prevented.

The following means is adopted in the damper device according to the present invention in order to achieve the above-mentioned main object.

A damper device according to an aspect of the present invention includes an input element, an intermediate element to which power is transferred from the input element through a first elastic body, and an output element to which power is transferred from the intermediate element through a second elastic body. In the damper device, one of the output element and the intermediate element has a protruding portion projecting in an axial direction, the other one of the output element and the intermediate element has a cutout portion corresponding to the protruding portion, and the protruding portion has a restricting portion that is engaged with the cutout portion in a rotation direction so as to restrict rotation of the intermediate element relative to the output element, and a support portion that is engaged with the cutout portion so that the intermediate element is supported by the output element in a radial direction.

The damper device includes the input element, the intermediate element to which power is transferred from the input element through the first elastic body, and the output element to which power is transferred from the intermediate element through the second elastic body. One of the output element and the intermediate element has the protruding portion projecting in the axial direction, and the other one of the output element and the intermediate element has the cutout portion corresponding to the protruding portion. The protruding portion has the restricting portion which is engaged with the cutout portion in the rotation direction so as to restrict rotation of the intermediate element relative to the output element, and the support portion which is engaged with the cutout portion so that the intermediate element is supported by the output element in the radial direction. As explained above, since one of the output element and the intermediate element is provided with the protruding portion, which includes the restricting portion that restricts rotation of the intermediate element relative to the output element and the support portion that allows the intermediate element to be supported by the output element in the radial direction, and the other one of the output element and the intermediate element is provided with the cutout portion corresponding to the protruding portion, it is possible to align the intermediate element easily and accurately and restrict rotation of the intermediate element relative to the output element, while preventing a cost increase by reducing working man-hours and simplifying configurations.

Further, at least either one of the restricting portion and the support portion of the protruding portion may be in surface contact with the cutout portion. Thus, a burden on the protruding portion engaged with the cutout portion is reduced, which improves durability.

The protruding portion may be formed by pressing. Thus, it is possible to form a plurality of the protruding portions in the output element or the intermediate element while ensuring good strength of the output element or the intermediate element.

The protruding portion may also be formed by cutting out and bending a part of the output element or the intermediate element. Thus, it is possible to easily form the plurality of protruding portions in the output element or the intermediate element.

The cutout portion may be a recessed portion having a circumferential-shaped bottom surface and inner side surfaces formed on both sides of the bottom surface in a circumferential direction, and a plurality of the cutout portions may be formed at intervals in an inner circumferential portion of the intermediate element. The protruding portion may have side surfaces serving as the restricting portions which are able to abut on the inner side surfaces of the recessed portion, and an outer periphery serving as the support portion which is able to be in sliding contact with the bottom surface of the cutout portion, and the plurality of protruding portions may be arranged on a same circle on the output element. Thus, it is possible to align the intermediate element easily and accurately, and to restrict rotation of the intermediate element relative to the output element, while preventing a cost increase by reducing working man-hours and simplifying configurations of the intermediate element and the output element.

The input element may be connected to an input member through a lock-up clutch, the input member being connected to a motor, and the output element may be connected to an input shaft of a transmission.

DETAILED DESCRIPTION OF THE EMBODIMENTS

Modes for carrying out the present invention will be explained with reference to embodiments.

Figure 1:
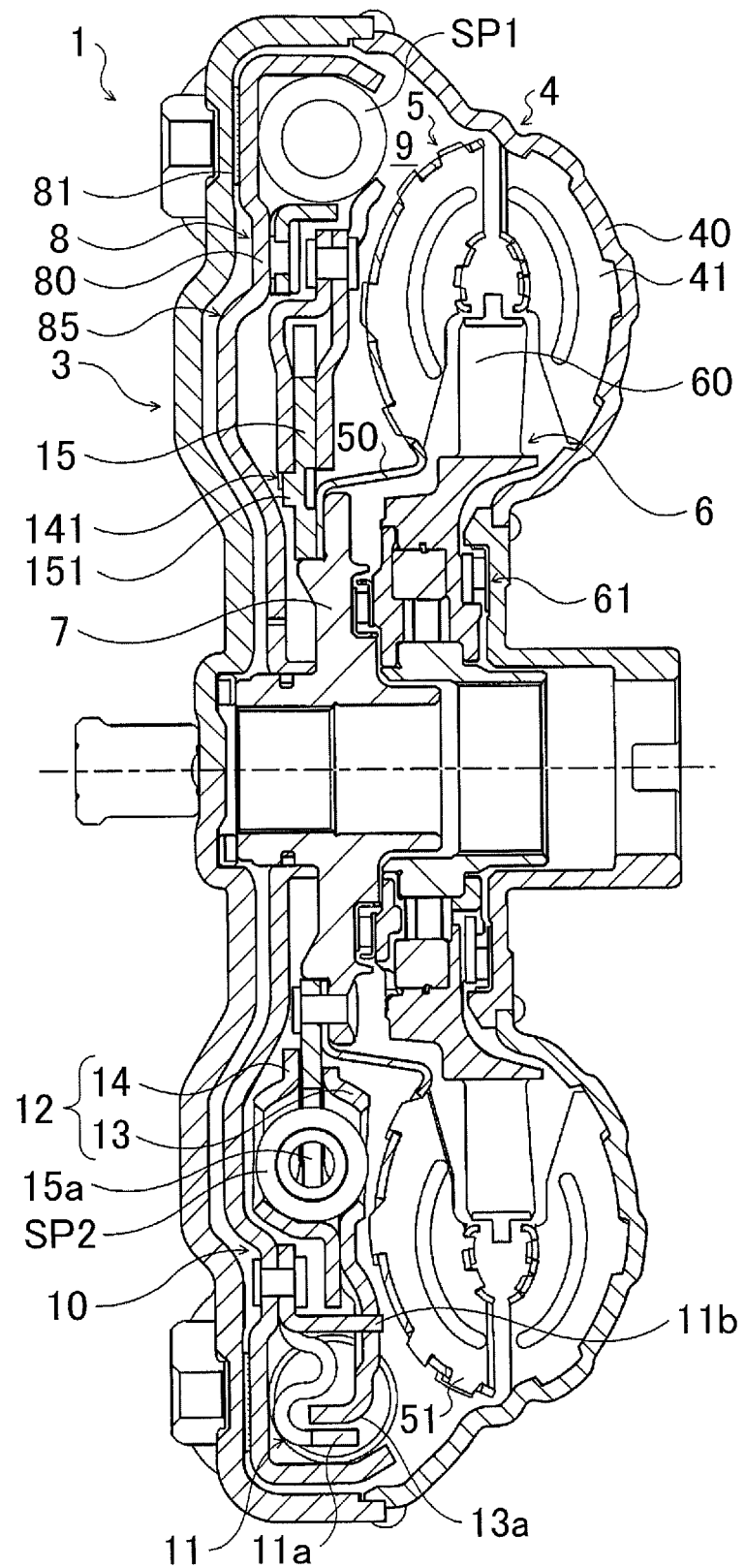
FIG. 1 is a partial sectional view showing a fluid transmission apparatus 1 having a damper device 10 according to an embodiment of the present invention.

FIG. 1 is a configuration view showing a fluid transmission apparatus 1 having a damper device 10 according to an embodiment of the present invention. The fluid transmission apparatus 1 shown in the drawing is a torque converter installed as a starting device in a vehicle having an engine (an internal combustion) as a motor, and includes a front cover (an input member) 3 connected to a crankshaft (not-shown) of the engine, a pump impeller (an input-side fluid transmission element) 4 fixed to the front cover 3, a turbine runner (an output-side fluid transmission element) 5 which is able to rotate coaxially with the pump impeller 4, a stator 6 that adjusts a flow of a hydraulic oil (a hydraulic fluid) from the turbine runner 5 to the pump impeller 4, a turbine hub (an output member) 7 fixed to an input shaft of a transmission (not-shown) that is either an automatic transmission (AT) or a continuously variable transmission (CVT), a single plate friction lock-up clutch mechanism 8, and the damper device 10 which has first springs SP1 and the second springs SP2 operating in series and is connected to the turbine hub 7 and the lock-up clutch mechanism 8.

The pump impeller 4 has a pump shell 40 closely fixed to the front cover 3, and a plurality of pump blades 41 arranged on an inner surface of the pump shell 40. The turbine runner 5 has a turbine shell 50, and a plurality of turbine blades 51 arranged on an inner surface of the turbine shell 50. The turbine shell 50 is fitted to the turbine hub 7 and fixed to the turbine hub 7 via a rivet. The stator 6 has a plurality of stator blades 60, and a rotation direction of the stator 6 is set to one direction only by a one-way clutch 61. The pump impeller 4 and the turbine runner 5 face each other, and the pump impeller 4, the turbine runner 5, and the stator 6 form a torus (an annular flow path) in which the hydraulic oil circulates.

The lock-up clutch mechanism 8 is able to perform lock-up, by which the front cover 3 is connected with the turbine hub 7 through the damper device 10, and is able to release the lock-up. As shown in FIG. 1, in the embodiment, a lock-up piston 80 of the lock-up clutch mechanism 8 is arranged inward of the front cover 3 and adjacent to an inner wall surface of the front cover 3 on an engine side (a left side in the drawing), and is fitted to the turbine hub 7 so as to be slidable in an axial direction and rotatable. A friction material 81 is attached to a surface of the lock-up piston 80 on an outer circumferential side and on a front cover 3 side. A lock-up chamber 85, which is connected to a hydraulic control unit (not shown) through a hydraulic oil supply hole (not shown) and an oil passage formed in the input shaft, is defined between a rear surface (a left-side surface in the drawing) of the lock-up piston 80 and the front cover 3.

When power is transferred between the pump impeller 4 and the turbine runner 5 without the lock-up being performed by the lock-up clutch mechanism 8, the hydraulic oil to be supplied to the pump impeller 4 and the turbine runner 5 flows into the lock-up chamber 85, and the lock-up chamber 85 is filled with the hydraulic oil. Therefore, in this case, the lock-up piston 80 does not move toward the front cover 3, and the lock-up piston 80 do not frictionally engaged with the front cover 3. When the lock-up is released as stated above where the lock-up by the lock-up clutch mechanism 8 is not performed, power from the engine serving as a motor is transferred to the input shaft of the transmission via a route from the front cover 3, the pump impeller 4, the turbine runner 5, and to the turbine hub 7.

When a pressure in the lock-up chamber 85 is reduced by the hydraulic control unit (not shown), the lock-up piston 80 moves towards the front cover 3 due to a pressure difference and is frictionally engaged with the front cover 3. Thus, the front cover 3 is connected to the turbine hub 7 through the damper device 10. While the lock-up is performed as stated above where the front cover 3 is connected with the turbine hub 7 by the lock-up clutch mechanism 8, power from the engine serving as the motor is transferred to the input shaft of the transmission via a route from the front cover 3, the lock-up clutch mechanism 8, the damper device 10, and to the turbine hub 7. In this case, variation (vibration) of torque that is input to the front cover 3 is absorbed by the first and second springs SP1 and SP2 of the damper device 10.

Figure 2:
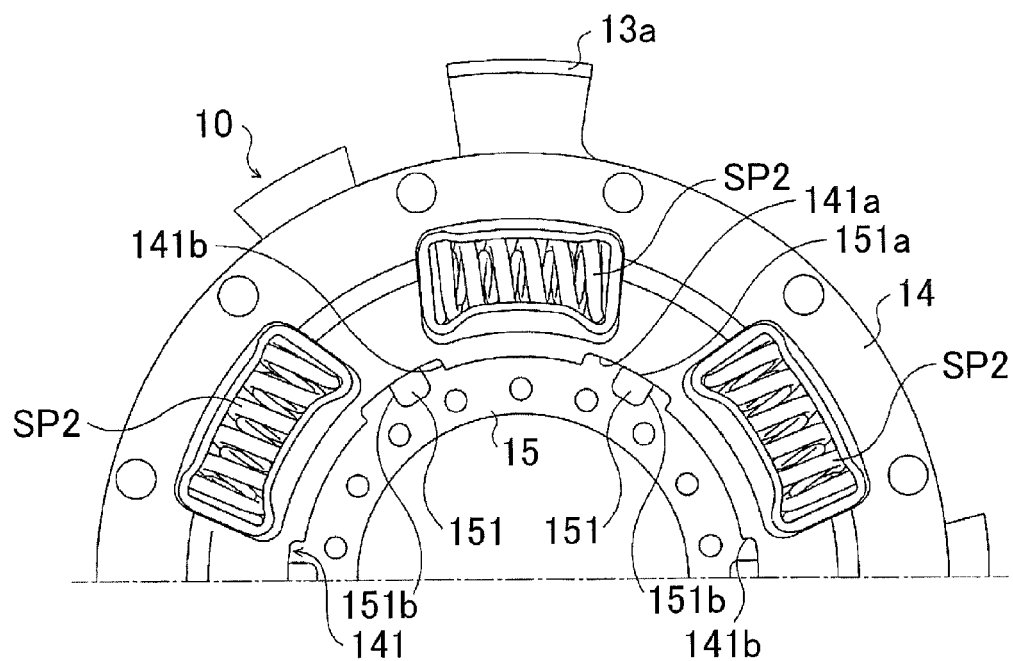
FIG. 2 is an enlarged view showing a main part of the damper device 10.

As shown in FIG. 1 and FIG. 2, the damper device 10 includes a driving member 11 serving as an input element, an intermediate member 12 engaged with the driving member 11 through the plurality of first springs (first elastic bodies) SP1, and a driven member (an output element) 15 engaged with the intermediate member 12 through the plurality of second springs (second elastic bodies) SP2. The driving member 11 includes spring abutment portions 11a, each of which abuts on one end of the corresponding first spring SP1, and spring support portions 11b. The driving member 11 is fixed to the lock-up piston 80 of the lock-up clutch mechanism 8 through a rivet, and arranged in an outer circumferential-side region within a fluid transmission chamber 9 that is defined by the front cover 3 and the pump shell 40 of the pump impeller 4.

Figure 3:
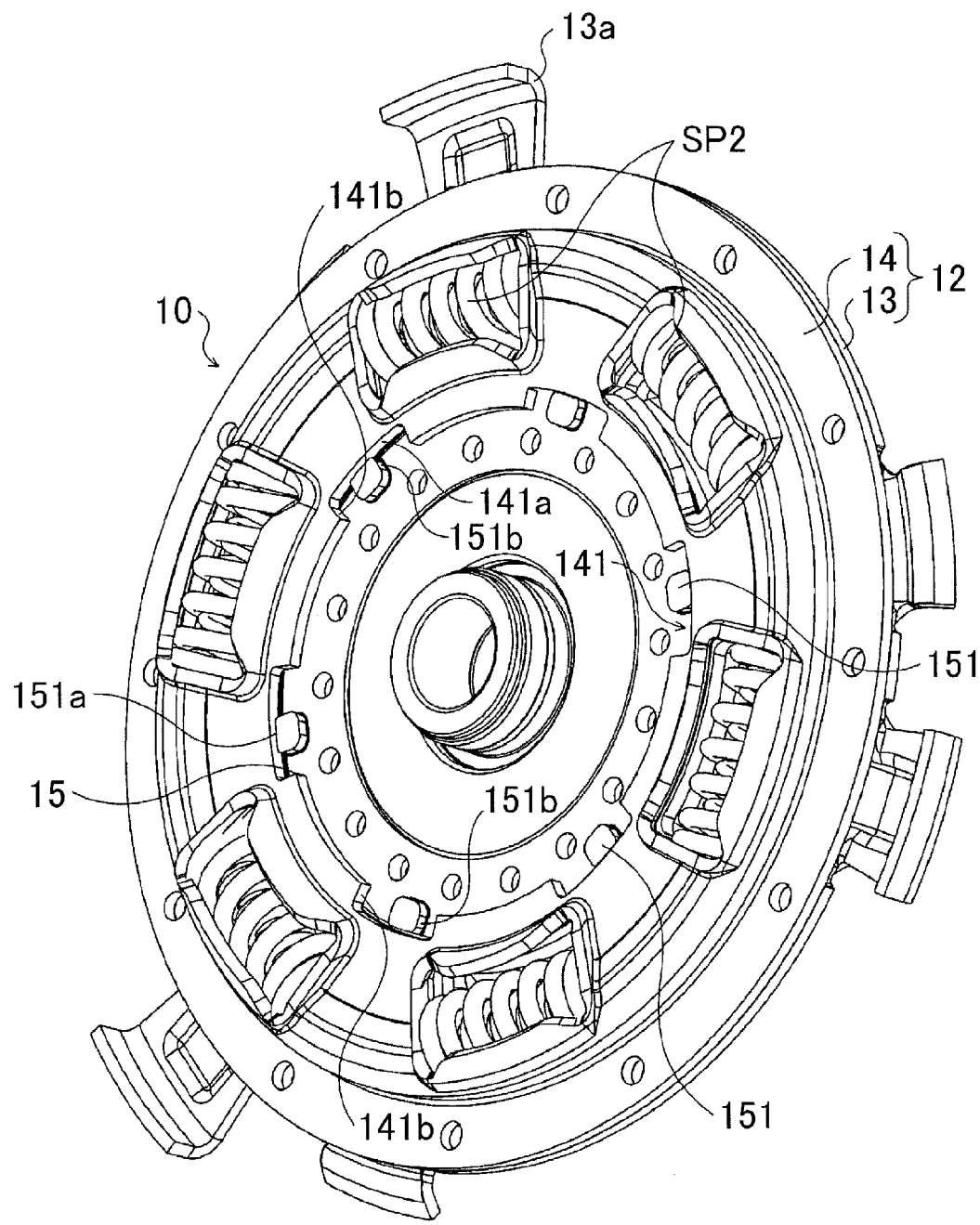
FIG. 3 is a perspective view of the damper device 10.

The intermediate member 12 is made up of an annular first plate 13, and an annular second plate 14 fixed to the first plate 13 through a rivet. The first plate 13 of the intermediate member 12 has spring abutment portions 13a on an outer circumferential side, each of which abuts on the other end of the corresponding first spring SP1, and spring support portions on an inner circumferential side for supporting the second springs SP2. The second plate 14 of the intermediate member 12 has spring support portions that face the spring support portions of the first plate 13 and support the second springs SP2, respectively. Also, spring abutment portions (not shown), each of which abuts on one end of the corresponding second spring SP2, are formed in the first and second plates 13 and 14. As shown in FIG. 2 and FIG. 3, recessed portions 141 serving as cutout portions are formed at equal intervals (at every 60° in the embodiment) in an inner circumferential portion of the second plate 14 that constructs the intermediate member 12. Each of the recessed portions 141 has a circumferential-shaped bottom surface 141a, and flat inner side surfaces 141b formed on both sides of the bottom surface 141a in a circumferential direction.

The driven member 15 is an annular member arranged between the first plate 13 and the second plate 14 of the intermediate member 12, fixed to the turbine hub 7 through a rivet, and thus connected to the input shaft of the transmission. The driven member 15 has spring abutment portions 15a, each of which abuts on the other end of the corresponding second spring SP2. Further, the driven member 15 has protruding portions 151 which are engaged with the recessed portions 141 of the second plate 14 included the intermediate member 12 and thus able to restrict rotation of the intermediate member 12 relative to the driven member 15 and support the intermediate member 12 in a radial direction.

Each of the protruding portions 151 is formed so as to projects in the axial direction towards the second plate 14 of the intermediate member 12 (to the left side in FIG. 1), and arranged on the same circle defined in the inner circumferential portion of the driven member 15. Each of the protruding portions 151 includes an outer periphery 151a serving as a circumferential-shaped support portion which is able to be in sliding contact (surface contact) with the bottom surface 141a of the recessed portion 141 of the intermediate member 12 (the second plate 14), and flat side surfaces 151b serving as restricting portions which are formed on both sides of the outer periphery 151a and are able to abut on (be in surface contact with) the inner side surfaces 141b of the recessed portion 141. As shown in the drawing, a circumferential length of each of the protruding portions 151 is smaller than a circumferential length of the recessed portion 141 of the intermediate member 12 (the second plate 14). Since the recessed portions 141 as described above are provided in the intermediate member 12, and the protruding portions 151 are arranged in the driven member 15, the intermediate member 12 is arranged about the axis of the fluid transmission apparatus 1 while being supported or aligned radially by the outer periphery 151a of each of the protruding portions 151, and is able to rotate relative to the driven member 15 within a range corresponding to a difference in circumferential length between the recessed portion 141 and the protruding portion 151.

In the embodiment, the protruding portions 151 are formed by pressing so that no cut lines are formed around each of the protruding portions 151. This makes it possible to form the protruding portions 151 easily in the driven member 15 while ensuring good strength of the driven member 15. While it is possible to form the protruding portions 151 by above-mentioned pressing so that all the outer peripheries 151a are included inside of the same circle about an axial core of the driven member 15, the outer peripheries 151a may also be ground where necessary.

As explained so far, the damper device 10 included in the fluid transmission apparatus 1 of the embodiment includes the driving member 11 serving as the input element, the intermediate member 12 to which torque is transferred from the driving member 11 through the first springs SP1, and the driven member 15 serving as the output element to which torque is transferred from the intermediate member 12 through the second springs SP2. Moreover, the driven member 15 has the protruding portions 151 that project in the axial direction, and the second plate 14 of the intermediate member 12 has the recessed portions 141 as cutout portions, each of which corresponds to one of the protruding portions 151. The protruding portion 151 has the outer periphery 151a serving as the support portion which is engaged (in sliding contact) with the corresponding recessed portion 141 so that the intermediate member 12 is supported radially by the driven member 15, and side surfaces 151b each serving as the restricting portion that is engaged with (abut on) the corresponding recessed portion 141 in the rotation direction and restrict rotation of the intermediate member 12 relative to the driven member 15. Thus, since the driven member 15 is provided with the protruding portions 151, each of which includes the outer periphery 151a that allows the intermediate member 12 to be supported radially by the driven member 15 and the side surfaces 151b that restrict rotation of the intermediate member 12 relative to the driven member 15, and the intermediate member 12 is provided with the recessed portions 141 each of which corresponds to one of the protruding portions 151, it is possible to align the intermediate member 12 easily and accurately and to restrict rotation of the intermediate member 12 relative to the driven member 15, while preventing a cost increase by reducing working man-hours and simplifying configurations. Instead of the recessed portions 141 serving as the cutout portions, openings (windows) may be formed in the second plate 14.

In the foregoing embodiment, the outer periphery 151a of the protruding portion 151 is in surface contact with the bottom surface 141a of the recessed portion 141, and the side surfaces 151b of the protruding portion 151 are in surface contact with the inner side surfaces 141b of the recessed portion 141. Because of this, a burden on each of the protruding portions 151 engaged with the corresponding recessed portion 141 that serves as the cutout portion is reduced, thereby durability can be improved.

Moreover, in the foregoing embodiment, the recessed portions 141 are formed at intervals in the inner circumferential portion of the second plate 14 that constructs the intermediate member 12. Each of the recessed portions 141 includes the circumferential-shaped bottom surface 141a and the inner side surfaces 141b formed on both sides of the bottom surface 141a in the circumferential direction. The protruding portions 151 are provided on the same circle on the driven member 15. Each of the protruding portions 151 includes the outer periphery 151a that is able to be in sliding contact with the bottom surface 141a of the recessed portion 141 of the intermediate member 12, and the side surfaces 151b that are able to abut on the inner side surfaces 141b of the recessed portion 141. Thus, it is possible to align the intermediate member 12 easily and accurately and to restrict rotation of the intermediate member 12 relative to the driven member 15 while preventing a cost increase by reducing working man-hours and simplifying the configurations of the intermediate member 12 and the driven member 15. Further, as in the foregoing embodiment, by pressing the protruding portions 151 in the driven member 15, it is possible to easily form the protruding portions 151 in the driven member 15 while ensuring good strength of the driven member 15.

Figure 4:
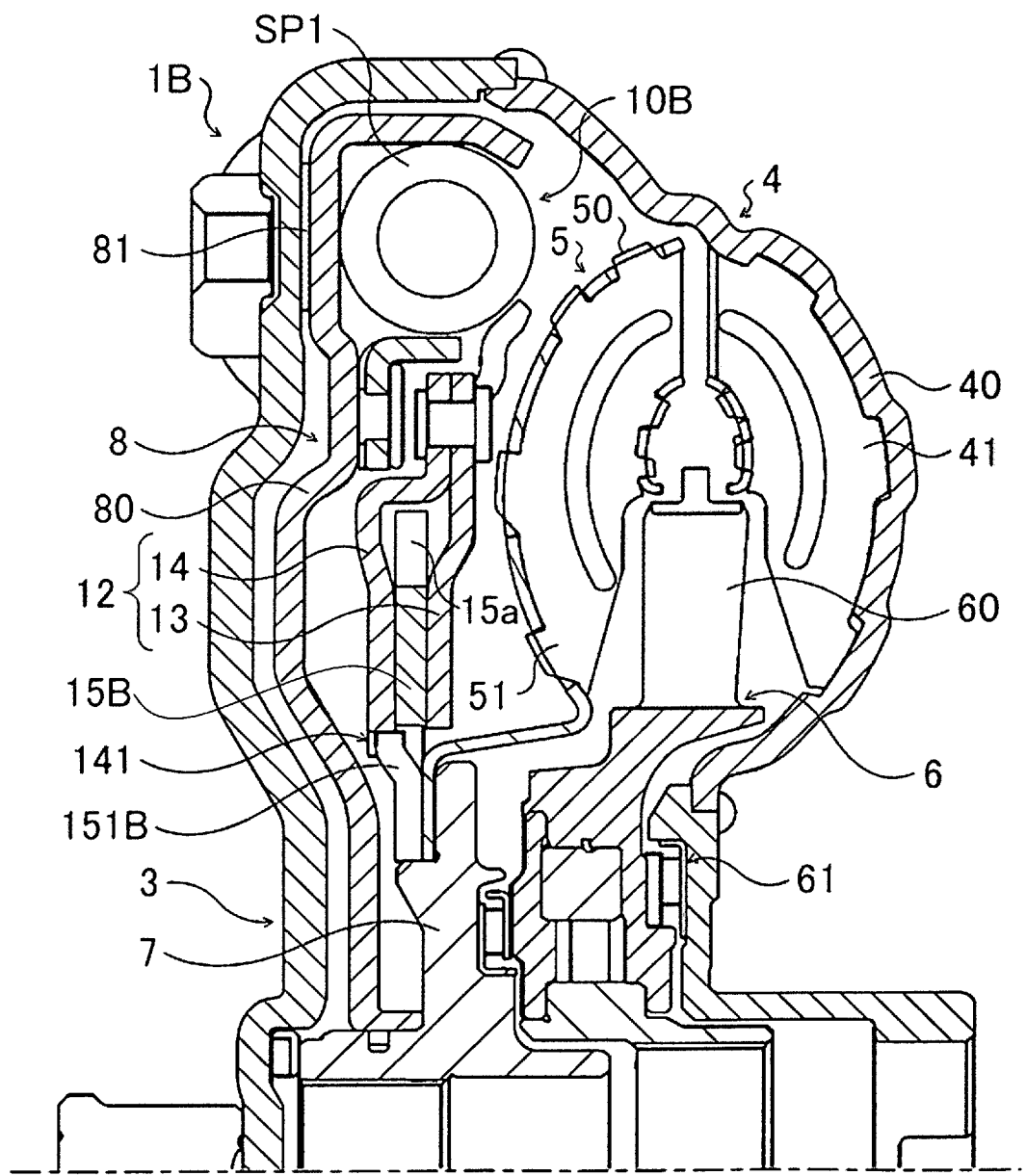
FIG. 4 is a schematic configuration view of a fluid transmission apparatus 1B having a damper device 10B according to a modified embodiment.
Figure 5:
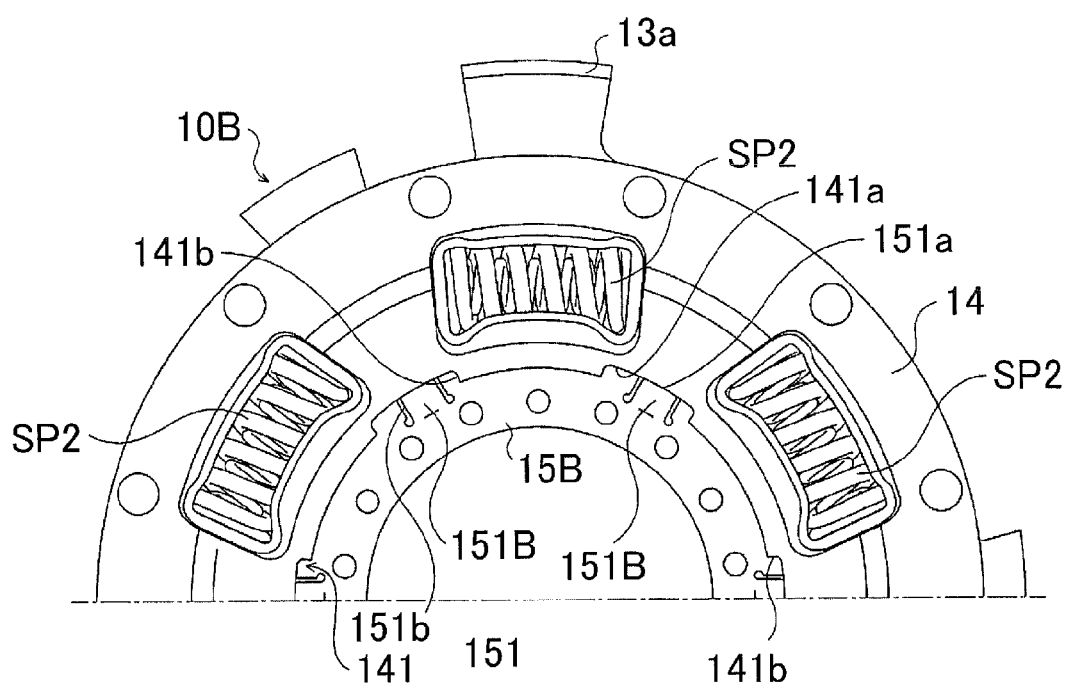
FIG. 5 is an enlarged view showing a main part of the damper device 10B according to the modified embodiment.

FIG. 4 is a schematic configuration view of a fluid transmission apparatus 1B provided with a damper device 10B according to a modified embodiment, and FIG. 5 is an enlarged view showing a main part of the damper device 10B according to the modified embodiment. In the following explanation, the same elements as those explained in relation to the foregoing damper device 10 will be indicated by the same reference numerals, and duplicated explanation will be omitted. In the damper device 10B shown in the drawings, each protruding portion 151B is formed by cutting out and bending part of a driven member 15B. Thus, it is possible to easily form the protruding portions 151B in the driven member 15B.

Figure 6:
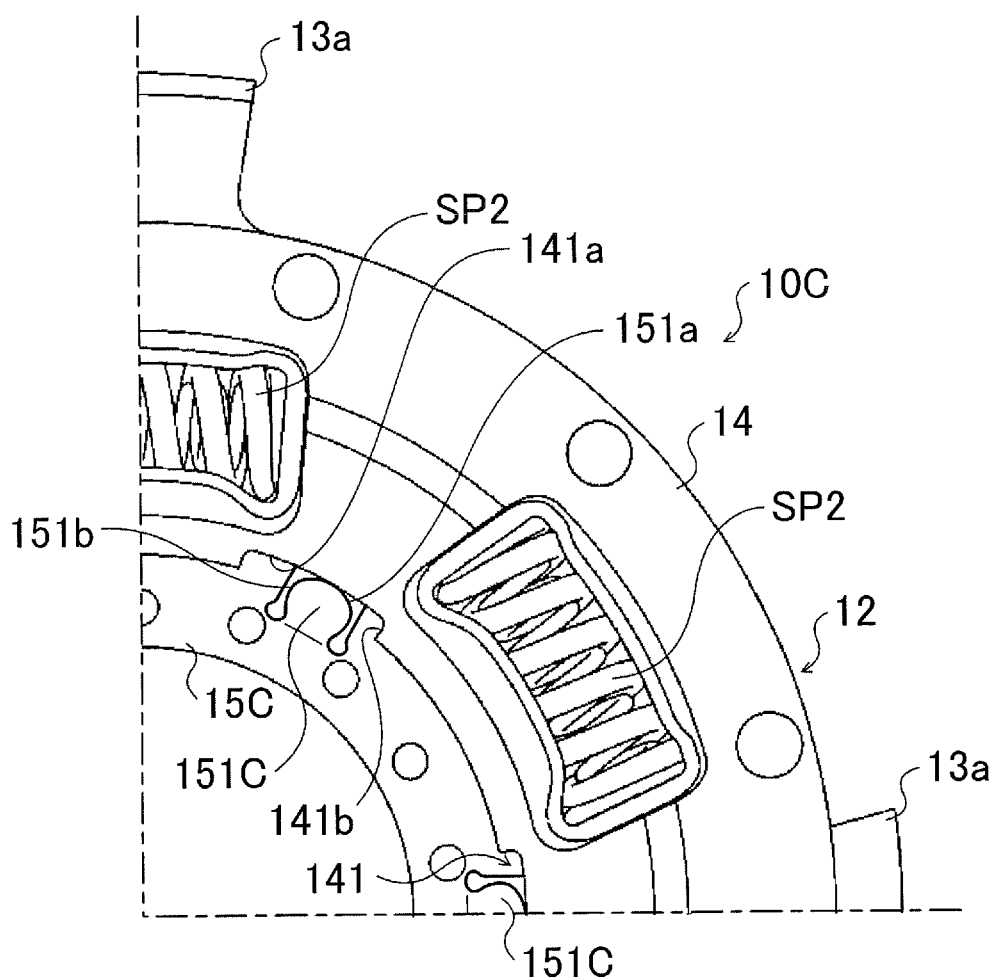
FIG. 6 is an enlarged view of a main part of a damper device 10C according to another modified embodiment.

FIG. 6 is an enlarged view of a main part of a damper device 10C according to another modified embodiment. In the damper device 10C shown in the drawing, an outer periphery 151a of a protruding portion 151C is formed into a circumferential shape with a smaller curvature than that of a bottom surface 141a of a recessed portion 141 so that the outer periphery 151a comes into line contact with the bottom surface 141a. Side surfaces 151b on both sides of the protruding portion 151C are formed into a circumferential shape so as to be in line contact with respective inner side surfaces 141b of the recessed portion 141. In other words, as in the damper device 10C in FIG. 6, the outer periphery 151a serving as a support portion, and the side surfaces 151b serving as restricting portions may be formed so as to be in line contact with the recessed portion 141 serving as a cutout portion. It is, however, a matter of course that either one of the outer periphery 151a serving as the support portion and the side surfaces 151b serving as the restricting portions may be formed so as to be in surface contact with the recessed portion 141 that serves as the cutout portion, and the other may be formed so as to be in line contact with the recessed portion 141. This type of protruding portion 151C may be formed by cutting out and bending, or pressing a part of the driven member 15 as shown in FIG. 6.

Figure 7:
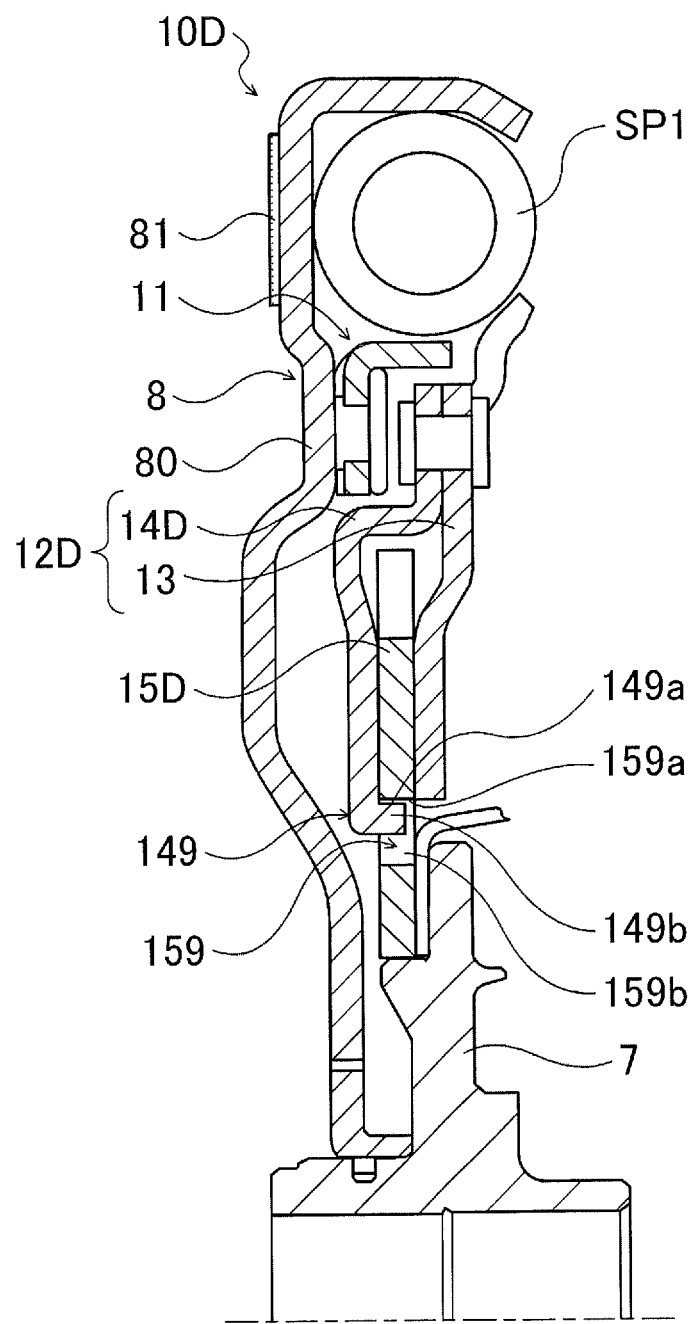
FIG. 7 is an enlarged sectional view of a main part of a damper device 10D according to yet another modified embodiment.

FIG. 7 is an enlarged view of a main part of a damper device 10D according to yet another modified embodiment. In the damper device 10D shown in the drawing, protruding portions 149 are formed at equal intervals in an inner circumferential portion of a second plate 14D that constructs an intermediate member 12D so that the protruding portions 149 project in an axial direction towards a driven member 15D. In the driven member 15D, approximately arc-shaped openings 159 are formed at equal intervals as cutout portions, each of which corresponds to one of the protruding portions 149. An outer periphery 149a of each of the protruding portions 149 is formed so as to be in surface contact or line contact with a circumferential surface 159a that defines the opening 159 and is on the outer circumferential side of the opening 159, and each side surface 149b in each of the protruding portions 149 is formed so as to be in surface contact or line contact with a corresponding one of inner surfaces 159b that define the opening 159 and are on both sides of the opening 159 in the circumferential direction. In other words, the protruding portion 149 of the second plate 14D includes the circumferential surface 159a serving as a support portion that is engaged with the corresponding opening 159 so as to allow the intermediate member 12D to be radially supported by the driven member 15D, and side surfaces 149b serving as restricting portions that are each engaged with the corresponding opening 159 in a rotation direction and restrict rotation of the intermediate member 12 relative to the driven member 15D. As described above, the intermediate member 12D may be provided with the protruding portions 149 that project in the axial direction, and the driven member 15D may be provided with the openings (cutout portions) 159 each of which corresponds to one of the protruding portions 149. Instead of the openings 159, recessed portions (cutout portions) may be formed in an inner circumferential portion of the driven member 15D. Each of the recessed portions has, for example, a circumferential-shaped bottom surface, and inner side surfaces formed on both sides of the bottom surface in the circumferential direction.

The damper devices 10, 10B, 10C, and 10D may be configured as a so-called parallel type damper device. The foregoing damper devices 10, 10B, 10C, and 10D may have a plurality of intermediate members, and, in such a case, the above-mentioned configuration may be applied to the intermediate member arranged in the most inner circumferential side among the plurality of intermediate members. The foregoing damper devices 10, 10B, 10C, and 10D may also be applied to a fluid coupling that does not include a stator that adjusts a flow of hydraulic oil into a pump impeller from a turbine runner. The lock-up clutch mechanism 8 may be configured as a so-called multi plate friction clutch.

Here, correspondence relations between main elements of the embodiment and modified embodiments, and main elements of the present invention set forth in the "summary of the invention" section will be explained. Namely, in the foregoing embodiment and so on, the damper device 10, 10B, 10C, or 10D, which includes the driving member 11 serving as the input element, the intermediate member 12 or 12D to which torque is transferred from the driving member 11 through the first springs SP1, and the driven member 15, 15B, 15C or 15D serving as the output element to which torque is transferred from the intermediate member 12 or the like through the second springs SP2, is equivalent to the "damper device", the protruding portions 149, 151, 151B, or 151C are equivalent to the "protruding portions", and the recessed portions 141 or the openings 159 are equivalent to the "cutout portions".

However, the correspondence relations between the main elements of the embodiment and the main elements of the present invention set forth in the "summary of the invention" section do not limit elements of the invention stated in the "summary of the invention" section, since the embodiment is only an example that is used to provide specific explanation of a mode for carrying out the invention stated in the "summary of the invention" section. In other words, the embodiment is merely a single specific example of the invention set forth in the "summary of the invention" section, and the invention stated in the "summary of the invention" section shall be interpreted based on the statements of the section The modes for carrying out the present invention have been explained using the embodiment, but it should be understood that the present invention is not limited to the foregoing embodiment whatsoever, and it goes without saying that various changes may be made without departing from the gist of the present invention.

The present invention is applicable to manufacturing fields of a damper device, a fluid transmission apparatus, and so on.

The invention claimed is:

1. A damper device comprising an input element, an intermediate element to which power is transferred from the input element through a first elastic body, and an output element to which power is transferred from the intermediate element through a second elastic body, wherein
   one of the output element and the intermediate element has a protruding portion projecting in an axial direction, the protruding portion being integrally formed from the one of the output element and the intermediate element,
   the other one of the output element and the intermediate element has a cutout portion corresponding to the protruding portion, and
   the protruding portion has a restricting portion that is engaged with the cutout portion in a rotation direction so as to restrict rotation of the intermediate element relative to the output element, and a support portion that is engaged with the cutout portion so that the intermediate element is supported by the output element in a radial direction, wherein at least either one of the restricting portion and the support portion of the protruding portion is in surface contact with the cutout portion.

2. The damper device according to claim 1, wherein the protruding portion is formed by pressing.

3. The damper device according to claim 1, wherein the protruding portion is formed by cutting out and bending a part of the output element or the intermediate element.

4. The damper device according to claim 1, wherein
the cutout portion is a recessed portion having a circumferential-shaped bottom surface, and inner side surfaces formed on both sides of the bottom surface in a circumferential direction, and a plurality of the cutout portions are formed at intervals in an inner circumferential portion of the intermediate element, and the protruding portion has side surfaces serving as the restricting portions which are able to abut on the inner side surfaces of the recessed portion, and an outer periphery serving as the support portion which is able to be in sliding contact with the bottom surface of the cutout portion, and a plurality of the protruding portions are arranged on a same circle on the output element.

5. The damper device according to claim 1, wherein the input element is connected to an input member through a lock-up clutch, the input member being connected to a motor, and the output element is connected to an input shaft of a transmission.

6. The damper device according to claim 1, wherein the intermediate element has a first intermediate plate and a second intermediate plate which are rotationally fixed to one another, and are arranged so as to sandwich the output element therebetween.

7. The damper device according to claim 1, wherein the protruding portion has a smaller radius of curvature than a radius of curvature of the cutout portion such that the support portion is in line contact with the cutout portion.

8. A damper device comprising an input element, an intermediate element to which power is transferred from the input element through a first elastic body, and an output element to which power is transferred from the intermediate element through a second elastic body, wherein one of the output element and the intermediate element has a protruding portion projecting in an axial direction, the other one of the output element and the intermediate element has a cutout portion corresponding to the protruding portion, and the protruding portion has a restricting portion that is engaged with the cutout portion in a rotation direction so as to restrict rotation of the intermediate element relative to the output element, and a support portion that is in surface contact with the cutout portion so that the intermediate element is supported by the output element in a radial direction.

9. The damper device according to claim 8, wherein the restricting portion of the protruding portion is in surface contact with the cutout portion.

10. The damper device according to claim 8, wherein the protruding portion is formed by pressing.

11. The damper device according to claim 8, wherein the protruding portion is formed by cutting out and bending a part of the output element or the intermediate element.

12. The damper device according to claim 8, wherein
the cutout portion is a recessed portion having a circumferential-shaped bottom surface, and inner side surfaces formed on both sides of the bottom surface in a circumferential direction, and a plurality of the cutout portions are formed at intervals in an inner circumferential portion of the intermediate element, and the protruding portion has side surfaces serving as the restricting portions which are able to abut on the inner side surfaces of the recessed portion, and an outer periphery serving as the support portion which is able to be in sliding contact with the bottom surface of the cutout portion, and a plurality of the protruding portions are arranged on a same circle on the output element.

13. The damper device according to claim 8, wherein the input element is connected to an input member through a lock-up clutch, the input member being connected to a motor, and the output element is connected to an input shaft of a transmission.

14. The damper device according to claim 8, wherein the intermediate element has a first intermediate plate and a second intermediate plate which are rotationally fixed to one another, and are arranged so as to sandwich the output element therebetween.

\* \* \* \* \*